(12) United States Patent
Yang et al.

(10) Patent No.: US 11,410,570 B1
(45) Date of Patent: Aug. 9, 2022

(54) COMPREHENSIVE THREE-DIMENSIONAL TEACHING FIELD SYSTEM AND METHOD FOR OPERATING SAME

(71) Applicant: Central China Normal University, Wuhan (CN)

(72) Inventors: Zongkai Yang, Wuhan (CN); Zheng Zhong, Wuhan (CN); Di Wu, Wuhan (CN); Xu Chen, Wuhan (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 17/574,767

(22) Filed: Jan. 13, 2022

Related U.S. Application Data

(63) Continuation of application No. PCT/CN2021/139874, filed on Dec. 21, 2021.

(30) Foreign Application Priority Data

Sep. 27, 2021 (CN) .......................... 202111133591.6

(51) Int. Cl.
*G09B 7/02* (2006.01)
*G06T 17/05* (2011.01)
(Continued)

(52) U.S. Cl.
CPC .............. *G09B 7/02* (2013.01); *G01B 21/18* (2013.01); *G01S 17/89* (2013.01); *G06T 7/70* (2017.01);
(Continued)

(58) Field of Classification Search
CPC .... G09B 7/02; G06T 7/70; G06T 9/00; G06T 13/40; G06T 15/005; G06T 17/005;
(Continued)

(56) References Cited

U.S. PATENT DOCUMENTS

| 2018/0108110 A1* | 4/2018 | Cuervo | ................... G06T 15/20 |
| 2020/0098284 A1* | 3/2020 | Yang | ...................... G09B 19/00 |
| 2020/0251006 A1* | 8/2020 | Sharma | .................. G06N 5/041 |

FOREIGN PATENT DOCUMENTS

| CN | 106648071 A | 5/2017 |
| CN | 108074278 A | 5/2018 |

(Continued)

OTHER PUBLICATIONS

Xueliang Chen and Tao Pang; Research on virtual reality optimization scheme based on 5G network; Guangdong Communication Technology, 2018, vol. 38, No. 2., China.

(Continued)

*Primary Examiner* — Hai Tao Sun

(57) ABSTRACT

A method for operating a comprehensive three-dimensional teaching field, including: collecting, by a sensor, a depth data of a real teaching space, point cloud data of a teacher and voice data of the teacher; performing calculation and caching of an architecture for data storage, transmission and rendering of a virtual teaching space based on edge cloud; building a database model of the virtual teaching space by using a R-tree spatial index structure to realize distributed data storage; generating a virtual avatar model updating in real time by positioning and tracking an action of a user; displaying an image of the virtual teaching space on terminals of the teacher and a student through encoding, uploading, 5G rendering and decoding by using a 5G link.

9 Claims, 8 Drawing Sheets

(51) Int. Cl.
| | |
|---|---|
| G06T 9/00 | (2006.01) |
| G06T 7/70 | (2017.01) |
| G10L 15/02 | (2006.01) |
| G10L 15/22 | (2006.01) |
| H04L 41/12 | (2022.01) |
| H04N 13/344 | (2018.01) |
| H04N 13/383 | (2018.01) |
| G06V 40/16 | (2022.01) |
| G06V 40/20 | (2022.01) |
| G06V 40/70 | (2022.01) |
| G06T 17/20 | (2006.01) |
| G06T 17/00 | (2006.01) |
| G06V 10/762 | (2022.01) |
| H04N 5/247 | (2006.01) |
| G06T 13/40 | (2011.01) |
| G10L 21/0232 | (2013.01) |
| G10L 15/30 | (2013.01) |
| G10L 19/16 | (2013.01) |
| H04L 67/10 | (2022.01) |
| G01S 17/89 | (2020.01) |
| G01B 21/18 | (2006.01) |
| G06T 15/00 | (2011.01) |
| H04L 67/568 | (2022.01) |
| G10L 21/0208 | (2013.01) |

(52) U.S. Cl.
CPC ............... *G06T 9/00* (2013.01); *G06T 13/40* (2013.01); *G06T 15/005* (2013.01); *G06T 17/005* (2013.01); *G06T 17/05* (2013.01); *G06T 17/20* (2013.01); *G06V 10/762* (2022.01); *G06V 40/165* (2022.01); *G06V 40/171* (2022.01); *G06V 40/23* (2022.01); *G06V 40/70* (2022.01); *G10L 15/02* (2013.01); *G10L 15/22* (2013.01); *G10L 15/30* (2013.01); *G10L 19/167* (2013.01); *G10L 21/0232* (2013.01); *H04L 41/12* (2013.01); *H04L 67/10* (2013.01); *H04L 67/568* (2022.05); *H04N 5/247* (2013.01); *H04N 13/344* (2018.05); *H04N 13/383* (2018.05); *G10L 2021/02082* (2013.01)

(58) Field of Classification Search
CPC ......... G06T 17/20; G06T 17/05; G06T 15/02; G06T 15/30; H04N 13/383; H04N 13/344; H04N 5/247; G06V 10/762; G06V 40/171; G06V 40/165; G06V 40/23; G06V 40/70; G01B 21/18; G01S 17/89; G10L 15/02; G10L 15/22; G10L 15/30; G10L 19/167; G10L 21/0232; G10L 2021/02082; H04L 41/12; H04L 67/10; H04L 67/2842
USPC .......................................... 345/419; 434/236
See application file for complete search history.

(56) References Cited

FOREIGN PATENT DOCUMENTS

| | | | |
|---|---|---|---|
| CN | 112230772 | A | 1/2021 |
| CN | 112562433 | A | 3/2021 |
| CN | 113095969 | A | 7/2021 |
| CN | 113240782 | A | 8/2021 |
| CN | 113242277 | A | 8/2021 |
| CN | 113362672 | A | 9/2021 |
| JP | 2021086145 | A | 6/2021 |

OTHER PUBLICATIONS

Yuanyuan Jiang, Shengchuan Zhou, Yong Han and Chunyong Ma; Research on Distributed VR-GIS Massive 3D Spatial Data Storage and Scheduling Model; Geo Spatial Information, Apr. 2013, vol. 11, No. 2; Ocean University of China, School of Information Science and Engineering, Department of Ocean Technology, Qingdao, Shandong 266100.

\* cited by examiner

COMPREHENSIVE THREE-DIMENSIONAL TEACHING FIELD SYSTEM AND METHOD FOR OPERATING SAME

CROSS-REFERENCE TO RELATED APPLICATIONS

This application is a continuation of International Patent Application No. PCT/CN2021/139874, filed on Dec. 21, 2021, which claims the benefit of priority from Chinese Patent Application No. 202111133591.6, filed on Sep. 27, 2021. The content of the aforementioned application, including any intervening amendments thereto, is incorporated herein by reference in its entirety.

TECHNICAL FIELD

This application relates to application of information technology in learning and teaching, and more particularly to a comprehensive three-dimensional teaching field system and a method for operating the same.

BACKGROUND

The three-dimensional (3D) comprehensive teaching field refers to a teaching field integrating real space and virtual space, which allows a situational teaching formed by teachers and the students, teaching resources, and virtual and real spaces. Real teaching environment, teaching resources, as well as model, movement and sound data of teachers and the students are collected based on multiple sensors, display terminals, and auxiliary equipment, and further, by virtue of 3D modeling, virtual reality, holographic imaging, 5th generation mobile communication technology (5G), an interaction of virtual avatars, virtual space, scenes and teaching resources. The behaviors of real teachers and the students in teaching are simultaneously simulated through mouth language and movement, thereby breaking through the barrier of physical space, and improving the immersion and sense of presence of teachers and the students. The 3D comprehensive teaching field system allows the teachers to make knowledge explanation, content display and natural interaction, so as to enhance the learns' knowledge understanding and interactive experience. The 3D comprehensive teaching field system can promote the development of intelligent education, reformation of teaching method, and the construction of an intelligent and interactive teaching field.

Unfortunately, the currently-constructed 3D comprehensive teaching field system is still limited by the following shortcomings.

(1) Insufficient Sense of Reality in a Virtual Teaching Space

Though great progress has been made in the individual technologies involved in the current virtual teaching space modeling, such as environmental perception, spatial orientation and motion capture, the virtual avatar still fail to vividly reflect actions and interactions of teachers and the students, thereby failing to reach the desired reality experience.

(2) Data Transmission Delay

The real-time integration of real and virtual teaching space requires the real-time transmission and distributed data storage of upstream and downstream massive data between cloud-edge-end. The data transmission delay will have a great impact on the real-time performance of the system, which directly affects the 3D teaching and learning experience.

(3) Lack of Content-Based Interaction Support

The 3D teaching field needs to be reformed in terms of knowledge explanation, content display, as well as teaching modes, teaching tools and teaching resources, to further optimize the teaching application.

SUMMARY

In view of the defects of the prior art, the present disclosure provides a three-dimensional (3D) comprehensive teaching field system and a method for operating the same to provide a novel and systematic method for the 3D comprehensive teaching field in terms of data collection, data transmission, spatial positioning and tracking, generation of realistic virtual avatars and teaching interaction.

Technical solutions of the disclosure are described as follows.

In a first aspect, this application provides a comprehensive three-dimensional (3D) teaching field system, comprising:
  a data collection module;
  a data transmission and management module;
  a data storage module;
  a spatial positioning and tracking module;
  a virtual avatar display module;
  a virtual teaching activity building module;
  a teaching interaction module;
  a teaching management module; and
  a terminal display module;
  wherein the data collection module is configured to collect a depth data of a real teaching scene, a point cloud data of a teacher and a voice data of the teacher;
  the data transmission and management module is configured to perform cloud rendering, cloud editing and adaptive transmission of different types of data in a 3D teaching field by utilizing a cloud-edge-end network architecture;
  the data storage module is configured to perform indexing, updating, scheduling and distributed storage of a data of a virtual teaching space;
  the spatial positioning and tracking module is configured to perform positioning and tracking of head, body and hands of the teacher and a student;
  the virtual avatar model display module is configured to generate a virtual avatar of the teacher and the student, and synchronize a mouth language and an action in real time;
  the virtual teaching activity building module is configured to create the virtual teaching space in the 3D teaching field, create a virtual teaching activity and allow the teacher and the student to join the virtual teaching activity;
  the teaching interaction module is configured to perform knowledge explanation a in various forms, 3D display of a teaching content and interaction feedback between the teacher and the student in the virtual teaching space;
  the teaching management module is configured to perform a teaching management service and a management service of the virtual teaching space and a virtual teaching resource; and the terminal display module is configured to perform content display, process of video image delay and time delay optimization control.

In a second aspect, this application also provides a method of operating the above 3D comprehensive teaching field system, comprising:
  (S1) collecting, by a time-of-flight (TOF) depth sensor, a light detection and ranging (LiDAR) and a neck-mounted headset, a depth data of a real teaching space, a point cloud data of a teacher and a teaching voice data respectively to build a surface mesh model of the real teaching space, a virtual avatar model of the teacher and a voice information of the teacher;

(S2) deploying an edge cloud at a school; performing data storage, transmission and rendering of a 3D comprehensive teaching field by using a cloud-edge-end network architecture, so as to support loading of a corresponding data and service on teacher and the student terminals from local and the edge cloud; managing an operation of an object based on state transition; and controlling the data transmission by using a fixation point estimating algorithm, a fixation point dynamic push flow and a dynamic adaptive streaming over HTTP (DASH) transfer protocol;

(S3) building a virtual teaching database model of the 3D teaching field based on a R-tree spatial index structure; generating new data storage and index nodes by appending an updated element file at an end; performing data scheduling according to a performance prediction model; and performing distributed data storage by using a 3D spatial data adaptive compression algorithm;

(S4) acquiring, by an ultra-wide-angle tracking sensor camera and an inertial measurement unit (IMU), a view point of the teacher and a view field range of the teacher; tracking and recognizing, by using an optical motion capture and tracking system, actions of head, body and limbs; and positioning a hand interaction point of the teacher;

(S5) customizing the virtual avatar model of the teacher and a virtual avatar model of the student; replacing a facial texture in real time; and synchronizing a mouth language and an action of the virtual avatar models of the teacher and the student in real time according to a received voice and motion information;

(S6) creating and arranging a virtual teaching field in the virtual teaching space; allowing the teacher to create a virtual teaching activity; and allowing the teacher and the student to enter the virtual teaching space by means of a classroom number or roaming to join the virtual teaching activity;

(S7) allowing the teacher and the student to perform the virtual teaching activity with a plurality of collaboration tools; allowing the teacher to explain knowledge and teaching content by means of voice, gesture, blackboard writing, sketch and 3D mind map; performing, by a mobile terminal, an interaction and feedback between the teacher and the student;

(S8) allowing the teacher to manage an announcement, message, homework release and question and answer (Q&A) information of the student in a personal space of the teacher; allowing the teacher to create, modify, delete and adjust the virtual teaching space; and allowing the teacher to manage and search the virtual teaching resource in the personal space of the teacher; and (S9) displaying a picture of the virtual teaching space on the teacher and student terminals through encoding, uploading, rendering and decoding by using 5G link; controlling decoding and display of a video by using a session-second-frame three-level bandwidth technology and a multi-level caching technology; and optimizing transmission and display delay based on prediction of a head action and a cloud asynchronous rendering technology.

Compared to the prior art, this application has the following beneficial effects.

A three-dimensional comprehensive teaching field system is constructed herein, in which the real teaching scene and a point cloud data and a voice data of a teacher are collected by a variety of sensors to generate a virtual teaching space and models and sound data of the teacher and the student. Th data storage, transmission and rendering of the virtual teaching space is performed by virtue of a cloud-edge-end network architecture. Different data and services are loaded on the teacher and the student terminals from local and the edge cloud. The object manipulation is managed by a state control mechanism. The data model of the virtual teaching space of the 3D teaching field is built based on a R-tree spatial index structure. The distributed data storage and data scheduling are performed according to a performance prediction model. The head, body and limb actions of the teacher and the student are tracked and recognized through the collaboration of a variety of sensors. The mouth language and action of a virtual avatar model is synchronized in real time. A teaching scene of the virtual teaching space is created and arranged, and the teacher can invite students to join a teaching activity created thereby and explain and show the knowledge by voice, gesture, blackboard writing, sketch and 3D mind map. The teacher can lead the teaching interaction and feedback through a mobile terminal, and edit, manage and push teaching information, and manage a scene of the virtual teaching space. Moreover, the teacher can also manage, push and search virtual teaching resource in his/her personal space. The picture of the virtual teaching space is displayed on the terminal device through encoding, uploading, rendering and decoding by using the 5G link. The display delay is controlled by a session-second-frame three-level bandwidth and a multi-level caching technology, and the transmission and display are optimized through the prediction of the head action and a cloud asynchronous rendering technology. With the rapid development of virtual reality, 5G education network and cloud-edge-end network architecture, the 3D comprehensive teaching field can satisfy requirements of the multi-scenario distance virtual teaching, and contributes to building a novel intelligent teaching environment.

DETAILED DESCRIPTION OF EMBODIMENTS

In order to make objects, technical solutions and advantages of the present disclosure clearer, the disclosure will be described in detail below with reference to the drawings and embodiments. It should be understood that these embodiments are merely illustrative, and not intended to limit the scope of the disclosure. Technical features in the various embodiments of the present disclosure can be combined on the premise that there is no contradiction therebetween.

Figure 1:
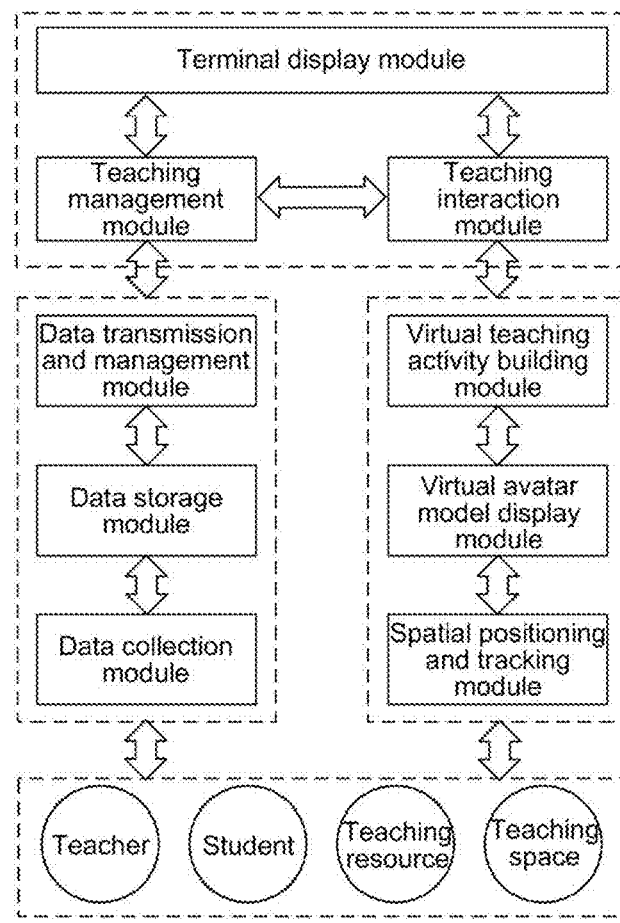
FIG. 1 is a block diagram of a three-dimensional comprehensive teaching field system according to an embodiment of the disclosure.

As shown in FIG. 1, a three-dimensional (3D) comprehensive teaching field system is provided, which includes a data collection module, a data transmission and management module, a data storage module, a spatial positioning and tracking module, a virtual avatar model representation module, a virtual teaching activity building module, a teaching interaction module, a teaching management module and a display module.

A method for operating the 3D comprehensive teaching field system is also provided herein, which is specifically described as follows.

(S1) A depth data of a real teaching space is collected by a time of flight (TOF) depth sensor to generate a depth map. A surface mesh model of a real teaching space is built. An object is divided according to a semantic feature. A point cloud data of a teacher is collected by a light detection and ranging (LiDAR) to generate a visualization model of the teacher. A voice data of the teacher is collected by a neck-mounted headset. The voice data of the teacher is bound to a virtual avatar model of the teacher by using adaptive differential pulse code modulation (ADPCM). The step (S1) is specifically performed through the following steps.

(S1-1) A depth data of a blackboard, platform, teaching tool and wall of the real teaching space are collected segmentedly by the TOF depth sensor. The depth data of the blackboard, platform, teaching tool and wall of the real teaching space are combined to generate the depth map of the real teaching space by using a feature matching algorithm shown as the formulas (1) and (2). The surface mesh model of the real teaching space is built by using a 3D Delaunay method. The object is divided into the blackboard, platform, teaching tool and wall according to the semantic feature.

The feature matching algorithm is performed through the following steps.

(1) A scale invariant feature transform (SIFT) feature point is detected.

The depth map of the real teaching space is transformed by using Gaussian kernel functions of different scales. A Gaussian difference pyramid of the depth map is built through downsampling by 2.

Each pixel is compared with an adjacent pixel. If a pixel is a maximum value or a minimum value, regard as a candidate feature point of an operator of the SIFT.

(2) The SIFT feature point is screened.

An unstable candidate feature point is removed by Harris corner detection, shown as the formula (1):

$$M = \sum_{x,y} w(x, y) \begin{bmatrix} I_x^2 & I_x I_y \\ I_x I_y & I_y^2 \end{bmatrix} \quad (1)$$

$$R = \det(M) - k \circ \text{trace}^2(M)$$

$$w(x, y) = \frac{1}{2\pi\sigma^2} e^{\frac{-(x^2+y^2)}{2\sigma^2}};$$

where $I_x$ and $I_y$ are a first gradient of pixel point in a x direction and a first gradient of pixel point in a y direction, respectively. $\sigma$ is configured to control a degree of Gaussian smoothing. det( ) is a determinant of the matrix. trace( ) is a trace of a matrix determinant. k is between 0.04-0.06. R is a corner response function. If R is greater than a threshold (the threshold is set according to a shape and a detail of the map), a point is defined as a feature point, or removed.

(3) A gradient magnitude of feature point L(x,y) and gradient direction of feature point L(x,y) are calculated, which is shown as formula (2):

$$M(x, y) = \left[ (L(x+1, y) - L(x-1, y))^2 + (L(x, y+1) - L(x, y-1))^2 \right]^{1/2} \quad (2)$$

$$\theta = \tan^{-1} \frac{L(x, y+1) - L(x, y-1)}{L(x+1, y) - L(x-1, y)};$$

A gradient direction and a modal value of a pixel around a feature point are counted through a histogram of oriented gradient. A direction of a peak of the histogram is defined as a main direction of the feature point.

(4) A feature descriptor is generated.

A window with a size of 16×16 pixels is selected with any feature point as a center within a scale space of the any feature point.

The window is divided into 16 sub-windows with a size of 4×4 pixels. A gradient and a histogram of oriented gradient in 8 directions of each of the sub-windows (including 0°, 45°, 90°, 135°, 180°, 225°, 270°, 315°) are obtained.

A value of gradient accumulation of the 8 directions is counted to form a feature vector of a feature descriptor. The feature vector is normalized to generate a SIFT feature descriptor.

(5) The feature matching is performed.

A feature point in the depth map is found. A closet feature point and a secondary closest feature point corresponding to the feature point in an image to be matched are searched through a k-dimensional (k-d) tree.

A ratio of an Euclidean distance between a feature point and one of two closet feature points to an Euclidean distance between the feature point and the other of the two closest feature points is calculated. If the ratio is less than the threshold, define the closet feature point as a homonymy matching point, or no homonymy matching point is existed.

(6) The image synthesis is performed.

A location of the depth map and a direction of the depth map are proofread according to the homonymy matching point. The overall depth map of the real teaching space is generated upon stitching and cropping.

Figure 2:
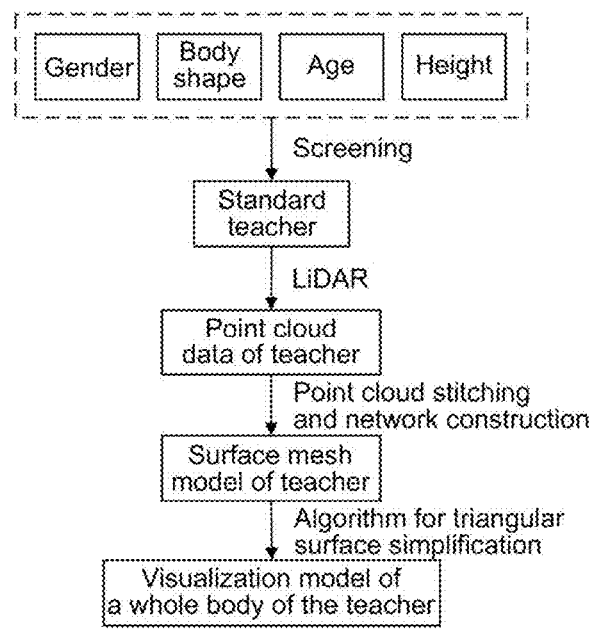
FIG. 2 is a flow chart of data collection of a teacher according to an embodiment of the disclosure.

(S1-2) As shown in FIG. 2, a teacher with a representative figure is selected according to gender, height, body shape and age. The point cloud data of the teacher is collected quickly by using the LiDAR in an order from head to feet then around surrounding. A surface model of the teacher is generated by point cloud stitching and construction. A visualization model of a whole body of the teacher is generated by using a triangular surface simplification algorithm (S1-3) The voice data of the teacher during teaching is collected by the neck-mounted headset. A noise is removed from the collected voice data by acoustic echo cancellation and noise reduction. The voice data is transmitted and bound to the virtual avatar model of the teacher in a 3D teaching activity by using the ADPCM.

(S2) An edge cloud is deployed. A cloud-edge-end network architecture is built to support a cloud rendering, cloud editing and data transmission. The teacher and a student are allowed to log in the virtual teaching space via a terminal. Different types of data and services are loaded from local and the edge cloud. loading, saving, updating and deleting operations operating of the object in the virtual teaching space are managed by using a state control mechanism. Data adaptive transmission is performed according to a display control parameter of a user. The step (S2) is specifically performed through the following steps.

Figure 3:
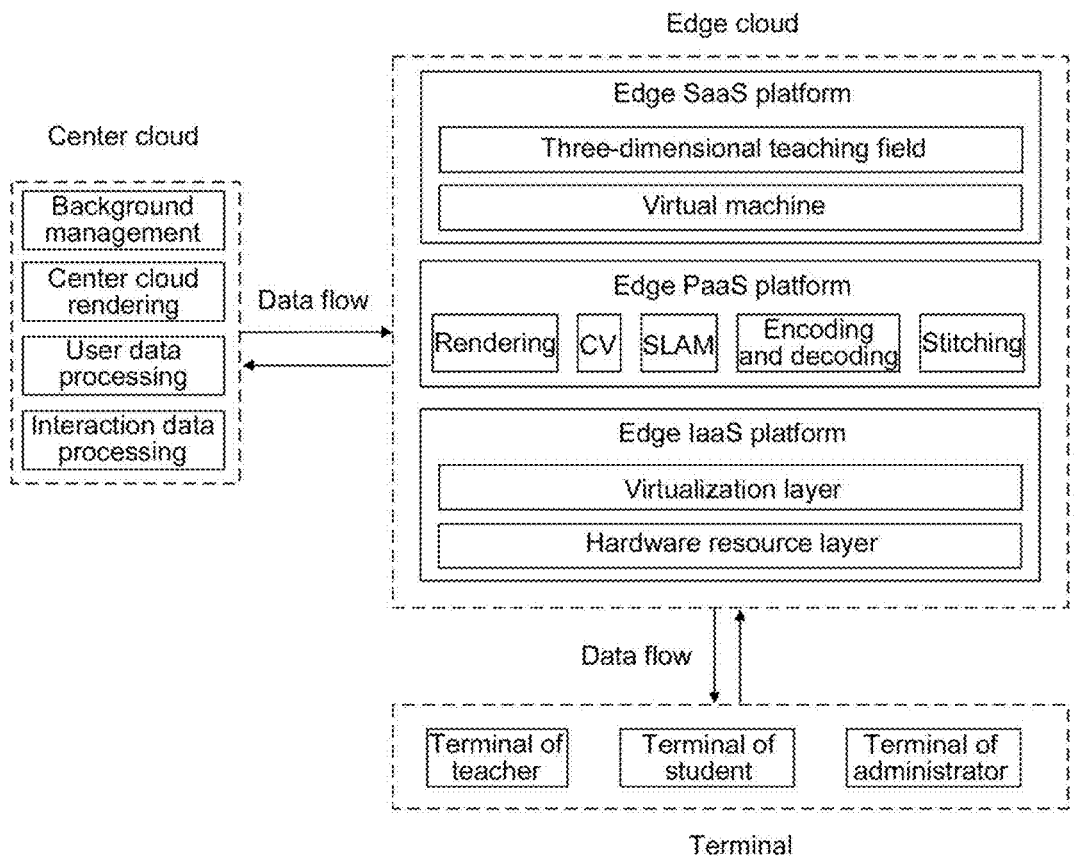
FIG. 3 is a block diagram of an edge cloud according to an embodiment of the disclosure.

(S2-1) A platform of the edge cloud is deployed at a concentrated use area of a 3D teaching field. The cloud-edge-end network architecture is built. As shown in FIG. 3, an infrastructure as a service (IaaS) layer is configured to provide a virtualization function of a central processing unit (CPU) and a graphics processor unit (GPU). A platform as a service (PaaS) layer is configured to provide multiple services, including stitching, encoding, decoding, rendering, computer version (CV) and simultaneous localization and mapping (SLAM) services of virtual teaching space data, teacher and the student model data and teaching resource data. A software as a service (SaaS) layer is configured to provide multiple services, including virtual machine and teaching at 3D teaching field.

A center cloud is configured to render with high demand in time delay, operate background management, process a user data and an interaction data, and transmit a processing result to the edge cloud.

The edge cloud is configured to save data, render with low demand in time delay and transmit a rendered data to a terminal device. The edge cloud has the following characteristics.

(1) A time delay of rendering thereof is within 10-15 ms. A high-quality concurrent rendering of multiple terminal devices of the 3D teaching field is allowed.

(2) A coded format and a coding strategy are selected adaptively, where the coded format includes H.264, high efficiency video coding (HEVC), H.266 and audio video coding standard (AVS); and the coding strategy includes quantization parameter (QP), bit rate and length of group of pictures (GOPs).

(3) A plurality of coding parameters are adjusted dynamically, where the plurality of coding parameters include frame rate, time delay, deinterlace, acuteness and contrast ratio.

Figure 4:
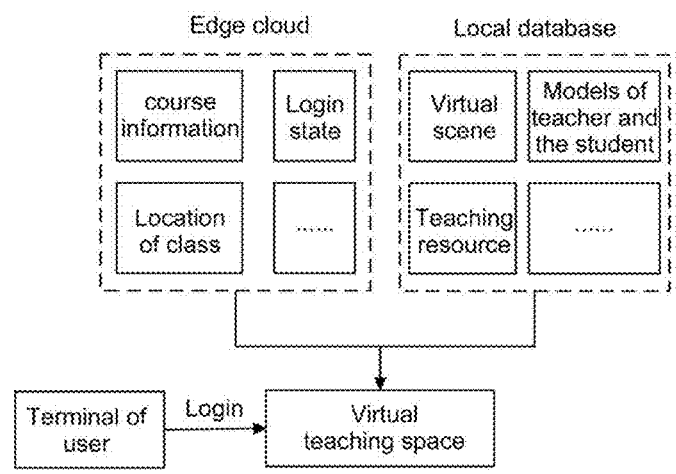
FIG. 4 is a flow chart of data loading according to an embodiment of the disclosure.

(S2-2) As shown in FIG. 4, a virtual scene, a virtual model of the teacher and the student and a teaching resource data are loaded by a display terminal from the local when the teacher and the student log in the virtual teaching space. A data request is sent to the edge cloud to obtain relevant course information, online or offline state and location of a classroom to be joined.

Figure 5:
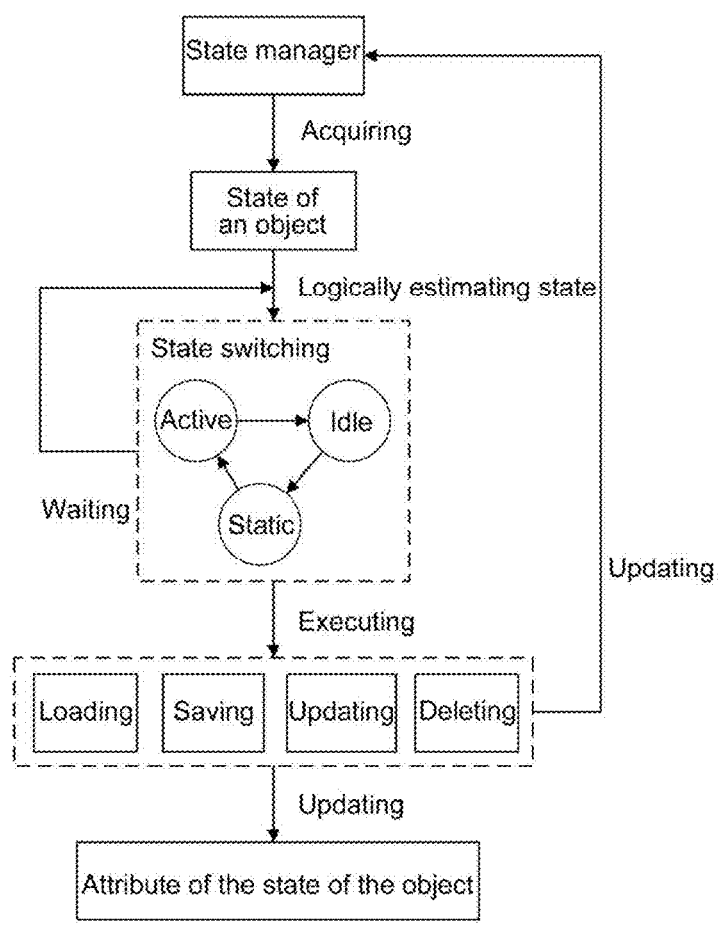
FIG. 5 is a flow chart of data state control according to an embodiment of the disclosure.

(S2-3) As shown in FIG. 5, a state control mechanism is designed according to a state of the data of the virtual teaching space, the virtual avatar model of the teacher and the student and a data of teaching resource in the virtual teaching space, performed as follows.

(1) A state of the virtual model of the teacher and the student, a state of a teaching field, and a state of teaching resource are represented by active, idle or static during start, execution and stop of the virtual teaching activity.

(2) A state of an object is read from a state manager during the virtual teaching space, the virtual model of the teacher and the student and object of the teaching resource are operated.

(3) Whether the current operation can be executed is estimated according to the state control mechanism. If a current operation is estimated to be unable to perform according to the state control mechanism, the current operation is suspended to wait for a next state check, or loading, saving, updating and deleting operation are executed according to a type of the current operation.

(4) The state manager is required to switch the state of the object upon completing the current operation, and to update an attribute of the state of the object.

Figure 6:
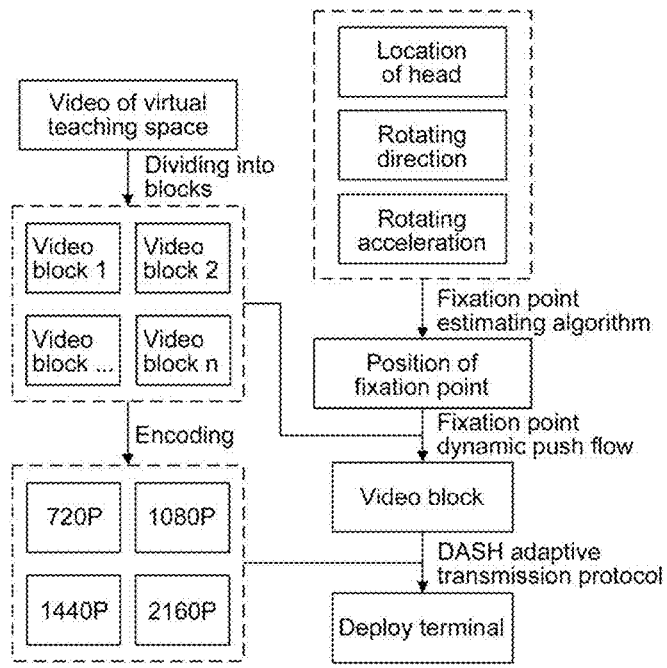
FIG. 6 is a flow chart of data transmission according to an embodiment of the disclosure.

(S2-4) As shown in FIG. 6, a fixation point-based adaptive streaming is realized by using a fixation point estimating algorithm, a dynamic push flow of fixation point and a dynamic adaptive streaming over HTTP (DASH) adaptive transmission protocol. The step (S2-4) is performed as follows.

According to location, rotating direction and rotating acceleration of a head of the user, an area of the fixation point is detected by using the fixation point estimating algorithm.

The fixation point estimating algorithm is performed as follows.

(1) A center coordinate of a pupil of the user $(X_{P_Q}, Y_{P_Q})$ and center coordinates of a corneal reflection point of the user $(X_{P_1}, Y_{P_1})$ and $(X_{P_2}, Y_{P_2})$ are calculated, performed through the following steps.

An eye is positioned through a gray level difference between a face, the corneal reflection point and the pupil.

An area of the pupil is positioned by a horizontal and vertical gray integration method.

The pupil and a spot center are determined by using an elmouthse fitting method and a centroid method upon detecting an edge of the pupil.

(2) An area of the fixation point is estimated, expressed as formula (3):

$$\begin{cases} \dfrac{X_Q}{\sqrt{X_Q^2 + Y_Q^2}} = \dfrac{X_{P_Q} - X_{P_1}}{\sqrt{(X_{P_Q} - X_{P_1})^2 + (Y_{P_Q} - Y_{P_1})^2}} \\ \dfrac{X_{L_2} - X_Q}{\sqrt{(X_Q - X_{L_2})^2 + Y_Q^2}} = \dfrac{X_{P_2} - X_{P_Q}}{\sqrt{(X_{P_Q} - X_{P_2})^2 + (Y_{P_Q} - Y_{P_2})^2}} \end{cases} \quad (3)$$

where $(X_Q, Y_Q)$ is a coordinate of the fixation point on a screen of the terminal device. $(X_{L_2}, Y_{L_2})$ is a coordinate of an infrared light source $L_1$ and $L_2$. Values of $Y_{L_1}$, $Y_{L_1}$, $Y_{L_2}$ are 0. A value of $X_{L_2}$ is a width of the screen of the terminal device, which can be obtained by measuring.

(3) The virtual teaching space is divided into multiple video blocks according to a time dimension and a space dimension. Each of the video blocks is generated a plurality of versions including 720P, 1080P, 1440P and 2160P.

(4) A transmitted video block is selected by using the dynamic push flow of fixation point according to the area of the fixation point. A version of each of the video blocks suitable for a current network speed is selected by using the DASH adaptive transmission protocol to perform adaptive streaming.

(S3) A virtual teaching database model is built to achieve a distributed system storage. A data storage and index node are generated by appending an updating feature file to an end. Data access and scheduling and prediction of performance change of the 3D teaching field are performed based on a performance prediction model. A distributed data storage is performed by using a 3D spatial data adaptive compression algorithm according to spatial clustering. The step (S3) is specifically performed as follows.

Figure 7:
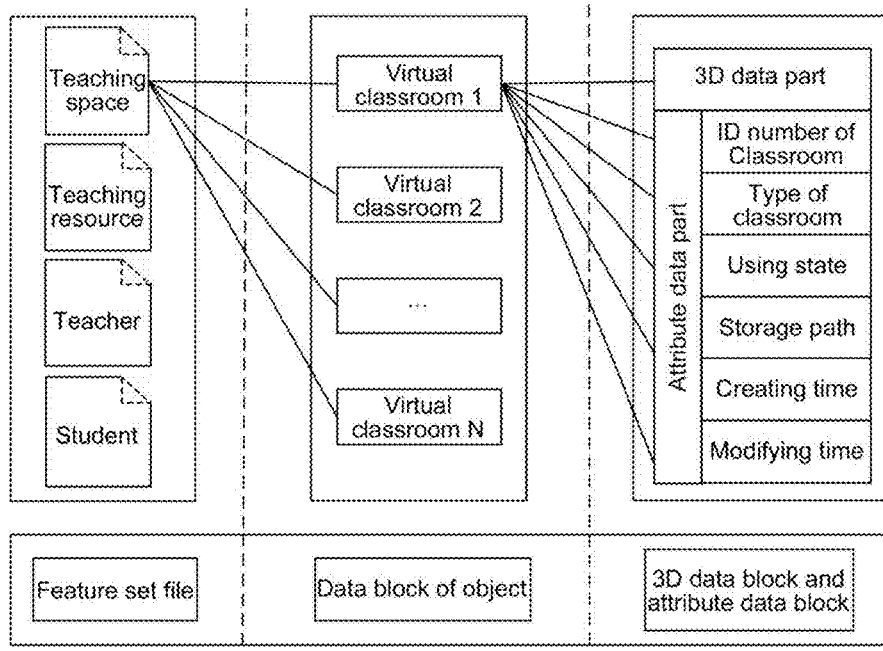
FIG. 7 schematically depicts a data granularity according to an embodiment of the disclosure.

(S3-1) In view of multi-source, heterogeneous and massive characteristics of the data of the 3D teaching field, a spatial index is built based on a spatial index data and an object identity (ID) of model in the virtual teaching space. As shown in FIG. 7, a feature dataset file is built according to three granularity levels of feature dataset-feature object- 3D model, attribute and audio/video element. For example, a virtual classroom is composed of a 3D model part and an attribute part, where the attribute part includes classroom ID, type of classroom, using state, storage path, creating time and modifying time. The virtual teaching database model is built based on a R-tree spatial index structure to realize a networked distributed data storage.

(S3-2) The data of the 3D teaching field is serialized into a plurality of data blocks according to a data type. New, edited, modified or deleted data are appended to end of a feature set file, as shown in Table 1. A newly appended relevant information of the object is recorded by using a descriptive information of the object. The updating data is sequentially written by segment. An updated index is added in the R-tree.

TABLE 1

Structure of descriptive information of object

| Data type | Data name | Descriptive information |
|---|---|---|
| FID | _id | Recording an ID of object |
| FCLSID | _clsid | Recording a feature type of object |
| INT | _state | Recording a state of object: 0, initial state; 1, deleting state; 2, updating state |
| unsigned long | _offset | Recording an offset of a DataBlock of object with respect to a head of file |
| unsigned long | _length | Recording a length of a DataBlock of object |
| GDBTIME | _write Time | Recording a writing time of object |
| GDBTIME | _update Time | Recording an update time of object |
| double | _bound | Recording a bounding box of object |

Figure 8:
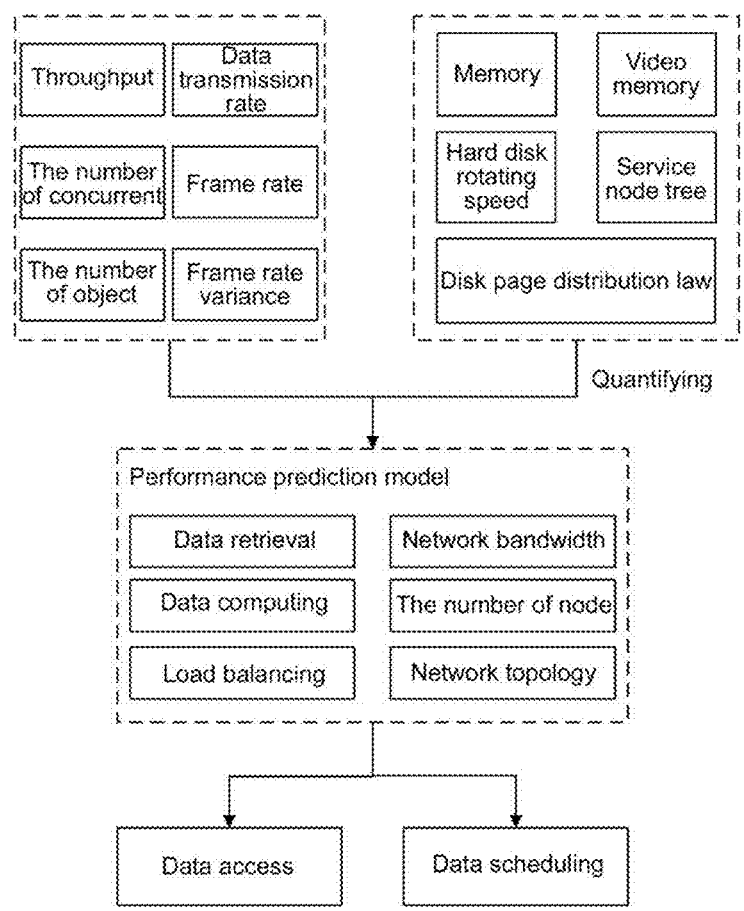
FIG. 8 is a flow chart of data scheduling according to an embodiment of the disclosure.

(S3-3) As shown in FIG. 8, a data transmission throughput, data transmission rate, the number of objects served per unit time, concurrency, frame rate and frame rate variance are extracted. Memory, video memory, hard disk rotating speed, service node tree and disk page distribution law are quantified. The performance prediction model is built in combination with a spatial index of the 3D comprehensive teaching field. Performance of data retrieval and computing, performance of load balancing of data flow and change of network bandwidth, the number of nodes, and network topology are monitored. The data access and scheduling and prediction of performance change in a network environment are performed (S3-4) A relevant object in an adjacent virtual teaching space is written to an adjacent or close position in a file by using the 3D spatial data adaptive compression algorithm based on spatial clustering. A database physical layer model and a database network layer model are built. A data distribution mode is formed combining a disk page attribute and a spatial data attribute stored in a disk page.

(S4) A head action of the teacher and the student are positioned and tracked by an ultra-wide-angle tracking sensor camera and an inertial measurement unit (IMU) to acquire a view point position and a view field range of the teacher and the student. The head action, a body action and a limb action of the teacher and the student are tracked and recognized by an optical motion capture and tracking system. A light spot information of a hand light-emitting diode (LED) lamp is collected by the ultra-wide-angle tracking sensor camera. A motion prediction model is built to accurately position a hand interaction point of the teacher and the student during teaching.

(S4-1) Four ultra-wide-angle tracking sensor cameras are arranged on top, bottom, left and right of a head mounted display to enlarge an overall observation range of the teacher and the student. A head location and a rotation posture of the teacher and the student are positioned and tracked by the IMU. A location of the view point and the view field range are acquired by using the fixation point estimating algorithm.

(S4-2) The head, body and limb actions of the teacher and the student during teaching are tracked by using the optical motion capture and tracking system. A positioning and tracking parameter corresponding to a real teaching space is generated by positioning and registering teaching actions of the teacher and the student. Head rotation, body movement and limb wave of the teacher and the student are tracked and recognized.

(S4-3) Four LED lamps are arranged on a hand controller. A flashing frequency of a light-emitting spot of the four LED lamps is synchronized with a shooting frequency of the four ultra-wide-angle tracking sensor cameras. A spatial coordinate and posture information of the four LED lamps is obtained by using binocular positioning and a Perspective-n-Point (PnP) algorithm. The step (S4-3) is specifically performed as follows.

(1) The light spot is detected by using an image recognition algorithm from an image of the hand controller collected by two of the ultra-wide-angle tracking sensor cameras arranged on left and right of the head mounted display. A blurred light spot which is disturbed by an ambient light is excluded.

(2) A spatial position of a LED lamp corresponding to the light spot is obtained through the binocular positioning algorithm.

(3) Four LED lamps and light spots thereof are selected. A six degrees of freedom (6 DoF) information of the four LED lamps in a camera view coordinate system is obtained through the PnP algorithm, expressed as formulas (4)-(9).

(4) The motion prediction model of hand is fitted out based on the 6 DoF information of the four LED lamps. A time delay of a hand action is compensated and optimized, such that the interaction point of hand of the teacher and the student are positioned.

The PnP algorithm is specifically performed as follows.

Figure 9:
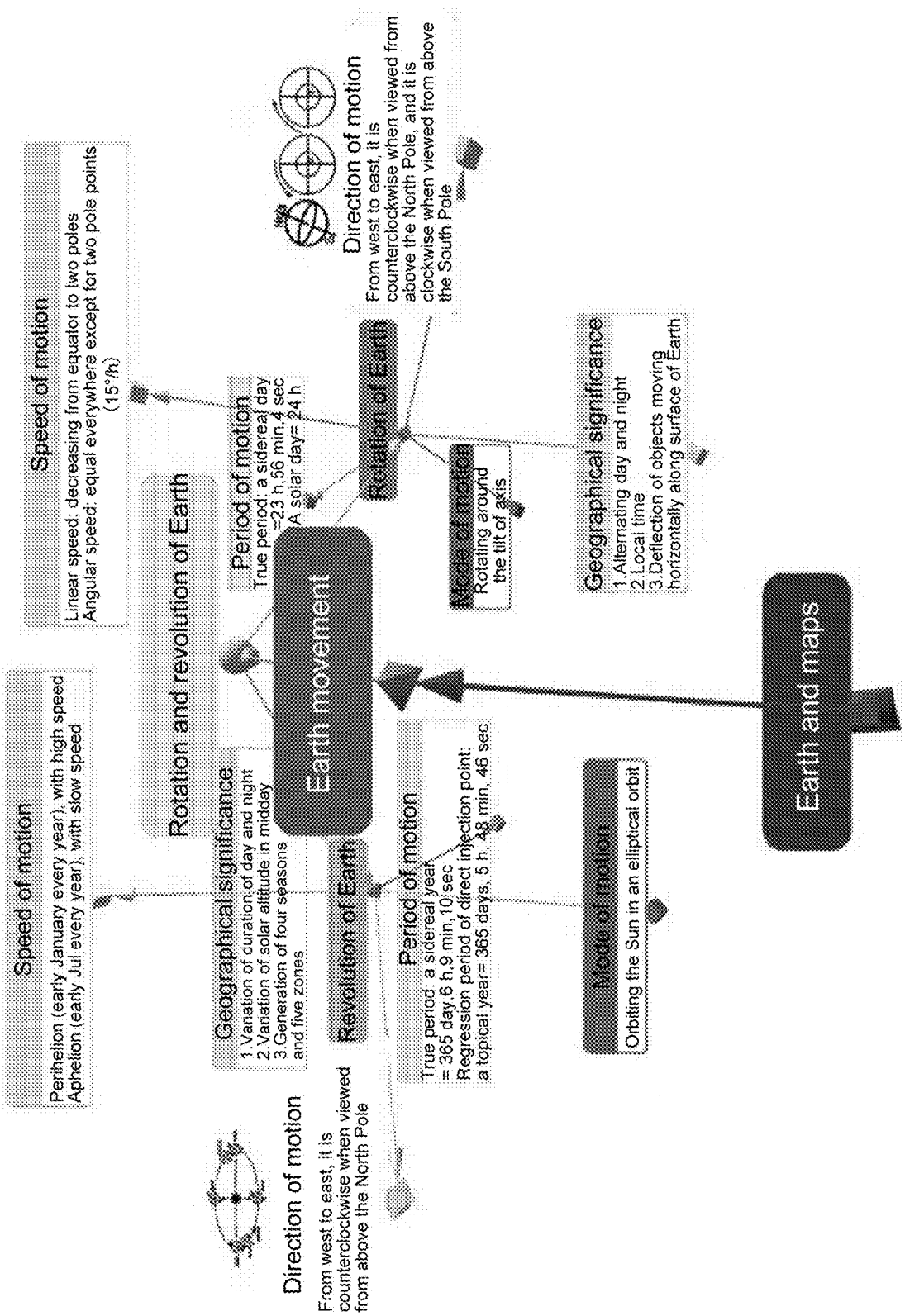
FIG. 9 schematically depicts a 3D mind map according to an embodiment of the disclosure.

(1) An angle equation of a camera optical center O with respect to three LED lamps A, B and C is constructed by a law of cosines, shown as FIG. 9 and performed through the following steps.

Distances between the three LED lamps A, B and C are calculated, expressed as Formula (4):

$$A = (X_0, Y_0, Z_0), B = (X_1, Y_1, Z_1), C = (X_2, Y_2, Z_2) \quad (4)$$
$$BC = \sqrt{(X_1 - X_2)^2 + (Y_1 - Y_2)^2 + (Z_1 - Z_2)^2}$$
$$AC = \sqrt{(X_0 - X_2)^2 + (Y_0 - Y_2)^2 + (Z_0 - Z_2)^2}$$
$$AB = \sqrt{(X_0 - X_1)^2 + (Y_0 - Y_1)^2 + (Z_0 - Z_1)^2}$$

According to a camera mapping model, normalized coordinates of pixel point are a=($u_0$, $v_0$, 1), b=($u_1$, $v_1$, 1), c=($u_2$, $v_2$, 1), respectively. A cosine of an included angle is calculated according to a scalar product, expressed as formulas (5) and (6)

$$\cos\alpha = \frac{\vec{ob}\cdot\vec{oc}}{|\vec{ob}||\vec{oc}|} = \vec{e}_b\cdot\vec{e}_c \quad (5)$$

$$\cos\beta = \frac{\vec{od}\cdot\vec{oc}}{|\vec{od}||\vec{oc}|} = \vec{e}_a\cdot\vec{e}_c \; ;$$

$$\cos\gamma = \frac{\vec{od}\cdot\vec{ob}}{|\vec{od}||\vec{ob}|} = \vec{e}_a\cdot\vec{e}_b$$

$$\vec{e}_a = \left(\frac{u_0}{\sqrt{u_0^2+v_0^2+1}}, \frac{v_0}{\sqrt{u_0^2+v_0^2+1}}, \frac{1}{\sqrt{u_0^2+v_0^2+1}}\right) \quad (6)$$

$$\vec{e}_b = \left(\frac{u_1}{\sqrt{u_1^2+v_1^2+1}}, \frac{v_1}{\sqrt{u_1^2+v_1^2+1}}, \frac{1}{\sqrt{u_1^2+v_1^2+1}}\right);$$

$$\vec{e}_c = \left(\frac{u_2}{\sqrt{u_2^2+v_2^2+1}}, \frac{v_2}{\sqrt{u_2^2+v_2^2+1}}, \frac{1}{\sqrt{u_2^2+v_2^2+1}}\right)$$

where point o=(0,0,0). coordinates of $\vec{oa}$, $\vec{ob}$ and $\vec{oc}$ are coordinates of point a, b and c, respectively.

(2) The above-mentioned equations are converted into binary quadratic equations. The binary quadratic equations are solved through Wu's method of characteristic set to obtained a ratio between solid geometry, such that coordinates of the LED lamps in the camera view coordinate system are obtained, performed through the following steps.

A binary quadratic form system is obtained through variable substituting by using the law of cosines, expressed as formulas (7)-(9):

$$OB^2 + OC^2 - 2OB\cdot OC\cdot\cos\alpha = BC^2 \quad (7)$$
$$OA^2 + OC^2 - 2OA\cdot OC\cdot\cos\beta = AC^2 \; ;$$
$$OA^2 + OB^2 - 2OA\cdot OB\cdot\cos\gamma = AB^2$$

$$OA = xOC, \; OB = yOC \quad (8)$$

$$p = 2\cos\alpha, \; q = 2\cos\beta, \; r = 2\cos\gamma$$

$$\frac{AB^2}{OC^2} = v, \; \frac{BC^2}{AB^2} = a, \; \frac{AC^2}{AB^2} = b; \; \text{and}$$

$$\begin{cases}(1-a)y^2 - ax^2 - yp + axyr + 1 = 0 \\ (1-b)x^2 - by^2 - xq + bxyr + 1 = 0\end{cases} \quad (9)$$

The above-mentioned binary quadratic form system is solved by using Wu's method of characteristic set to obtained x and y, such that the coordinates of the three lamps A, B and C in the camera view coordinate system are obtained.

(3) The 6 DoF information of the LED lamps in the camera view coordinate system is obtained through an iterative closest point (ICP) algorithm, by utilizing the coordinates of the LED lamps in the camera view coordinate system and known coordinates of the LED lamps in a world coordinate system.

(S5) A virtual avatar model of the teacher and the student are selected according to a personalization parameter of the teacher and the student. A facial texture is mapped. A decoded voice feature is analyzed according to a received voice data. The voice feature is mapped to a deformation of a mouth feature point to synchronize a mouth language of the virtual avatar model. A motion of the teacher and the student are dynamically tracked by an optical motion capture device. The virtual avatar model in the virtual teaching space is updated in real time. The step (S5) is specifically performed as follows.

(S5-1) The virtual avatar model of the teacher and the student are selected from a human body model library according to height, body shape, age and gender of the teacher and the student. The facial feature is extracted from a head image of the teacher and the student by using a face recognition algorithm. A keypoint of the facial texture is mapped to an eyebrow, eye, nose, mouth and facial contour corresponding to a head of the virtual avatar model by using a keypoint detection algorithm.

(S5-2) A mouth area of the virtual avatar model is determined through a horizontal projection and vertical projection. A feature point of upper lip, lower lip, left angulus oris and right angulus oris of the mouth area of the virtual avatar model are extracted by the keypoint detection algorithm. Four mouths, including an open mouth, half open mouth, slightly open and closed mouth are designed by adjusting position of the mouth feature point. An amplitude of sound and speech speed are analyzed by using fast Fourier transform (FFT) after decoding the voice data. The four mouths are matched according to the amplitude of sound. A switching speed between the four mouths is controlled according to the speech speed. The deformation of the mouth feature point is mapped to synchronize a mouth language. A voice-mouth mapping based on a Gaussian mixture model is specifically performed as follows.

(1) A training based on the Gaussian mixture model is expressed as formulas (10)-(12):

$$x_t = [x_t(1), x_t(2), ?, x_t(D_x)]^T$$

$$y_t = [y_t(1), y_t(2), ?, y_t(D_y)]^T \quad (10);$$

where $x_t$ is a voice feature vector of a tth frame with a dimension of $D_x$. $y_t$ is a mouth feature vector with a dimension of $D_y$.

The voice feature and mouth feature are modeled by using the Gaussian mixture model, expressed as follows:

$$P(z_t|\lambda^{(z)}) = \sum_{k=1}^{K}\pi_k N(z_t|\mu_k^{(z)}, \Sigma_k^{(z)}); \quad (11)$$

$$z_t = [x_t^T, y_t^T]^T \quad (12)$$

$$\mu_k^{(z)} = \begin{bmatrix}\mu_k^{(x)} \\ \mu_k^{(y)}\end{bmatrix}$$

$$\Sigma_k^{(z)} = \begin{bmatrix}\Sigma_k^{(xx)} & \Sigma_k^{(xy)} \\ \Sigma_k^{(yx)} & \Sigma_k^{(yy)}\end{bmatrix};$$

where k is the number of a single Gaussian model. $\pi_k$ is a weighting factor. Any Gaussian distribution $N(x; \mu_k, \Sigma_k)$ is a constitutional unit of the Gaussian mixture model. $\lambda^{(z)}$ is a parameter set of the Gaussian mixture model, including a weighting factor, mean vector and covariance matrix of each constitutional unit. A mean vector of a kth constitutional unit is $\mu_k^{(z)}$. a covariance matrix of the kth constitutional unit is $\Sigma_k^{(z)}$. $\mu_k^{(x)}$ is a mean vector of a voice feature vector of the kth constitutional unit. $\mu_k^{(y)}$ is a mean vector of a mouth feature vector of the kth constitutional unit. $\Sigma_k^{(xy)}$ is a covariance matrix of the voice feature vector of the kth constitutional unit. $\Sigma_k^{(yy)}$ is a covariance matrix of the mouth feature vector of the kth constitutional unit. $\Sigma_k^{(xy)}$ and $\Sigma_k^{(yx)}$ both are a cross covariance matrix of the voice feature vector and the mouth feature vector.

The Gaussian mixture model is trained by using an expectation-maximization (EM) algorithm. A joint vector of the voice feature vector and the mouth feature vector is taken as a training set.

(2) A mapping based on the Gaussian mixture model is expressed as formulas (13)-(16).

A conditional probability of calculating the mouth feature is $P(y_t|x_t, \lambda^{(z)})$ for the voice feature vector $x_t$, expressed as formulas (13)-(14):

$$P(y_t \mid x_t, \lambda^{(z)}) = \sum_{k=1}^{K} P(k \mid x_t, k, \lambda^{(z)}); \tag{13}$$

$$P(k \mid x_t, \lambda^{(z)}) = \frac{\pi_k N\left(x_t; \mu_k^{(x)}, \sum_k^{(xx)}\right)}{\sum_{n=1}^{K} \pi_k N\left(x_t; \mu_n^{(x)}, \sum_n^{(xx)}\right)} \tag{14}$$

$$P(y_t \mid x_t, k, \lambda^{(z)}) = N(y_t; E_{k,t}^{(y)}, D_k^{(y)})$$

$$P(k \mid x_t, k, \lambda^{(z)}) = P(k \mid x_t, \lambda^{(z)}) \cdot P(y_t \mid x_t, k, \lambda^{(z)}).$$

A mean vector of a kth conditional distribution $E_{k,t}^{(y)}$ and a covariance matrix of the kth conditional distribution $D_k^{(y)}$ are expressed as formula (15):

$$E_{k,t}^{(y)} = \mu_k^{(y)} + \sum_k^{(yx)} \sum_k^{(xx)-1} (x_t - \mu_k^{(x)}) \tag{15}$$

$$D_k^{(y)} = \sum_k^{(yy)} - \sum_k^{(yx)} \sum_k^{(xx)-1} \sum_k^{(xy)}.$$

An evaluation target parameter vector $\hat{y}_t$ obtained by a minimum mean square error mapping is configured to control the deformation of the mouth feature vector, expressed as formula (16):

$$\hat{y}_t = E[y_t \mid x_t] = \int P(y_t \mid x_t, \lambda^{(z)}) y_t dy_t = \tag{16}$$

$$\int \sum_{k=1}^{K} P(k \mid x_t, \lambda^{(z)}) P(y_t \mid x_t, k, \lambda^{(z)}) y_t dy_t = \sum_{k=1}^{K} P(k \mid x_t, \lambda^{(z)}) E_{k,t}^{(y)}.$$

(S5-3) The body action and hand action of the teacher and the student acquired in the real teaching space are bound to a bone and hand joint of the virtual avatar model. A motion of the teacher and the student, such as turning, moving and waving hand, are dynamically tracked by the optical motion capture device. A corresponding joint of the virtual avatar model of the teacher and the student is driven to move to update and synchronize the motion in real time.

(S6) A school, teaching building and classroom similar to those in the real teaching space are created in the virtual teaching space. A position of a table, chair, whiteboard and screen are set according to a teaching requirement. A teaching activity is created by the teacher according to a teaching plan and curriculum schedule. An activity notification is sent to the student by using a course management function. The teacher and the student are allowed to enter the virtual teaching space through jumping or roaming according to a classroom number to join the virtual teaching activity in a form of virtual avatar model. The step (S6) is specifically performed as follows.

(S6-1) A virtual school, teaching building and classroom similar to the real teaching space are created in the virtual teaching space. The virtual teaching space is named according to an association rule. A unique ID number is generated. The positions of the table, chair, whiteboard and screen are set according to the teaching requirement to enable the virtual teaching space to be suitable for group teaching and discussion.

(S6-2) The teacher is allowed to create the virtual teaching activity according to the teaching plan and course schedule. A name or ID number of the virtual teaching activity is associated (set by classroom number or according to school-teaching building-classroom level by level). The activity notification is sent to the student by means of the course management function, where the activity notification includes a starting time and duration of the virtual teaching activity and a classroom location.

(S6-3) The teacher and the student are allowed to join the virtual teaching activity in a form of the virtual avatar model according to the course schedule upon receiving a course notification or reminder. The teacher and the student are allowed to enter the virtual teaching space by jumping according to the classroom number, or to enter the virtual teaching space through a browse sequence of school-teaching building-classroom. The student is allowed to sit at an allocated seat or randomly.

(S7) The virtual avatar of the teacher and the student in the virtual teaching space are allowed to perform the virtual teaching activity with the help of a plurality of collaboration tools. The teacher is allowed to explain knowledge by means of voice, gesture, blackboard writing and sketch. Creation, connection, organization and display of a teaching content are performed by using a 3D mind map. Location of the teaching resource and a display mode of the teaching resource are controlled by a mobile terminal to achieve an interaction and feedback between the teacher and the student. The step (S7) is specifically performed as follows.

(S7-1) The teacher and the student are allowed to enter the virtual teaching space in a form of the virtual avatar model. A real name or a real-time video is displayed on the virtual avatar model. A one-to-one or one-to-many virtual teaching activity is carried out by using a virtual whiteboard, 3D model, flow chart, instant messaging tool and real-time video tool. The knowledge explained by the teacher to the student by means of voice, gesture, blackboard writing and sketch.

(S7-2) A 3D mind mapping function is introduced into the virtual teaching space. The teacher is allowed to visually display a concept, process, conclusion in the teaching activity, as well as classification and hierarchical relationship of a knowledge point via capturing, moving or rotating a 3D graphic element, text and image. The teacher is allowed to create, connect and organize a virtual teaching content. The FIG. 9 illustrates a 3D mind map of the first lesson of "Rotation and revolution of Earth" of the second section of "Earth movement" of the first chapter "Earth and maps" in the seventh grade of Geography by People's Education Press, expressed as follow:

(1) A hierarchical relationship of chapters, sections, lessons, concepts, and knowledge points are represented by different 3D graphic elements respectively, expressed as follow.

A first level illustrates the chapter—"Earth and maps" represented by a square frustum.

A second level illustrates the section—"Earth movement" represented by a triangular pyramid.

A third level illustrates the lesson—"Rotation and revolution of Earth" represented by a sphere.

A fourth level illustrates the concepts—"Rotation of Earth" and "Revolution of Earth".

A fifth level illustrates the knowledge points—"Mode of motion", "Direction of motion", "Speed of motion", "Period of motion" and "Geographical significance".

(2) The chapters, sections, lessons, concepts and knowledge points at different levels are connected stepwise by multiple arrows, expressed as follows.

The arrows point from an upper level to a next lower level. As shown in FIG. 9, a head end of an arrow is connected to the first level—"Earth and Maps". A tail end of the arrow is connected to the second level—"Earth movement".

(3) A name and content of the chapters, sections, lessons, concepts and knowledge points are represented by a text. The name and content thereof are represented by different background colors to distinguish. The text is displayed directly above the 3D graphic element, expressed as follows.

The name of the lesson is "Rotation and Revolution of Earth". The name of the concepts includes "Rotation of Earth" and "Revolution of Earth". The name of the keypoints includes "Mode of Motion", "Direction of Motion", "Speed of Motion", "Period of Motion" and "Geographical significance".

The content of the "Direction of Motion" of the "Rotation of Earth" includes "From west to east, it is counterclockwise when viewed from above the North Pole, and it is clockwise when viewed from above the South Pole".

(4) A content of the keypoints is displayed through an image. The image is displayed upon the text. For example, an image of Earth movement viewed from above the South Pole and above the North Pole is displayed upon a square text of the knowledge point "Direction of Motion" of the concept "Rotation of Earth".

(S7-3) The display location and the display mode of the teaching resource are set by the teacher via the mobile terminal. The teacher is allowed to ask a question to a single student, a group of students or all of students. The question is sent to a selected student or all students. The selected student is allowed to answer the question through inputting an answer in the mobile terminal or via a real-time video.

Figure 10:
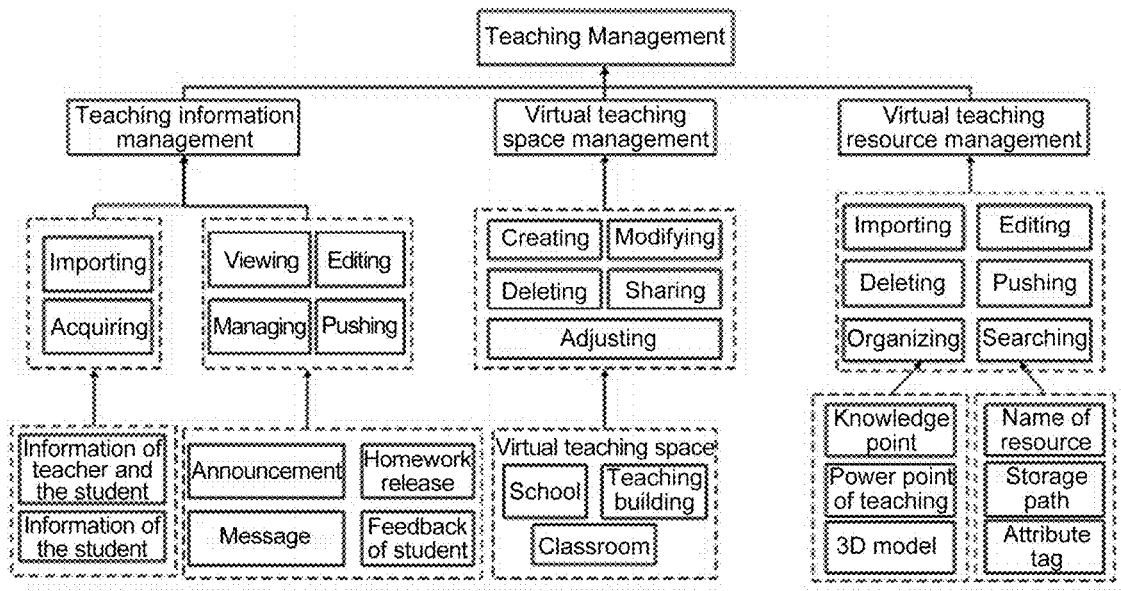
FIG. 10 is a flow chart of teaching management according to an embodiment of the disclosure.

(S8) As shown in FIG. 10, an administrator is allowed to import an information of the teacher and the student. The teacher is allowed to acquire information of learners who select a course. The teacher is allowed to manage an announcement, message, homework release and question and answer (Q&A) information in a personal space of the teacher. The teacher is allowed to add, modify, delete and adjust the virtual teaching space followed by sharing to other teachers and the students upon being approved by the administrator. The teacher is allowed to manage the virtual teaching resource in the personal space of the teacher and search the virtual teaching resource in a variety of ways. The step (S8) is specifically performed through the following steps.

(S8-1) The virtual teaching space is allowed to access to a national public education platform. The information of the teacher and the student is imported by the administrator according to a setting of a permission policy. The teacher is allowed to view the information of the student and manage an information in the personal space of the teacher and the course information, performed as follows.

(1) An information of a student selecting a corresponding course is acquired according to information of course selection.

(2) The announcement, message, homework release and Q&A information of the student in the personal space of the teacher are allowed to view, edit, manage and push by the teacher.

Figure 11:
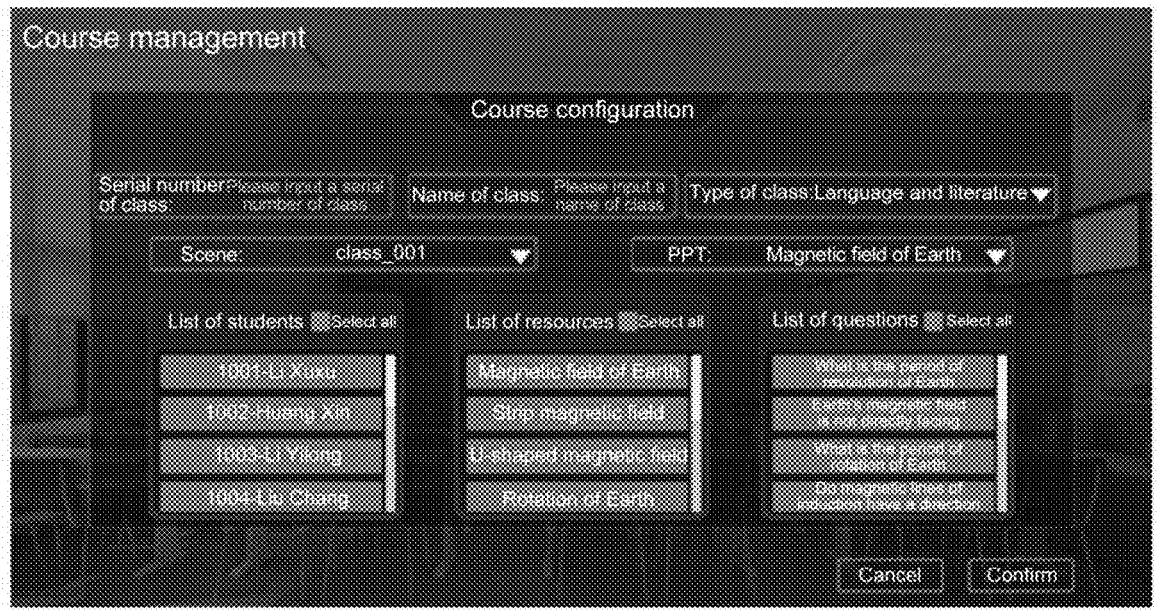
FIG. 11 is a flow chart of course management according to an embodiment of the disclosure.

(3) As shown in FIG. 11, the course information is viewed, edited and managed, specifically including a serial number of class, name of class, type of class, scene, power point (PPT), list of student, list of resource and list of question.

(S8-2) A unified world coordinate system is built. The teacher is allowed to add, modify, delete and adjust the school, teaching building and classroom in the virtual teaching space followed by uploading to a cloud server, then sharing to other teacher and the students upon being approved by the administrator.

(S8-3) A cloud resource base is built. The virtual teaching resource is imported, edited and deleted by the teacher in the personal space of the teacher. The virtual teaching resource is pushed to the terminal device of the student. The virtual teaching resource is organized through a knowledge tree. The virtual teaching resource is searched through a resource name, attribute tag and storage path.

(S9) A content of the view field range and a content of a certain range extending out of viewing angles of the view field are selected followed by displaying on the terminal through encoding, uploading, 5G rendering and decoding by using a 5G link. A bandwidth fluctuation of the terminal is controlled by using a Session-second-frame three-level bandwidth technology. A video image frame is decoded by frame by using a multi-level caching technology. The video image is displayed. Multi-path transmission (MTP) delay of upstream motion, downstream content and image are controlled through combination of a prediction of the head action and a cloud asynchronous rendering technology.

Figure 12:
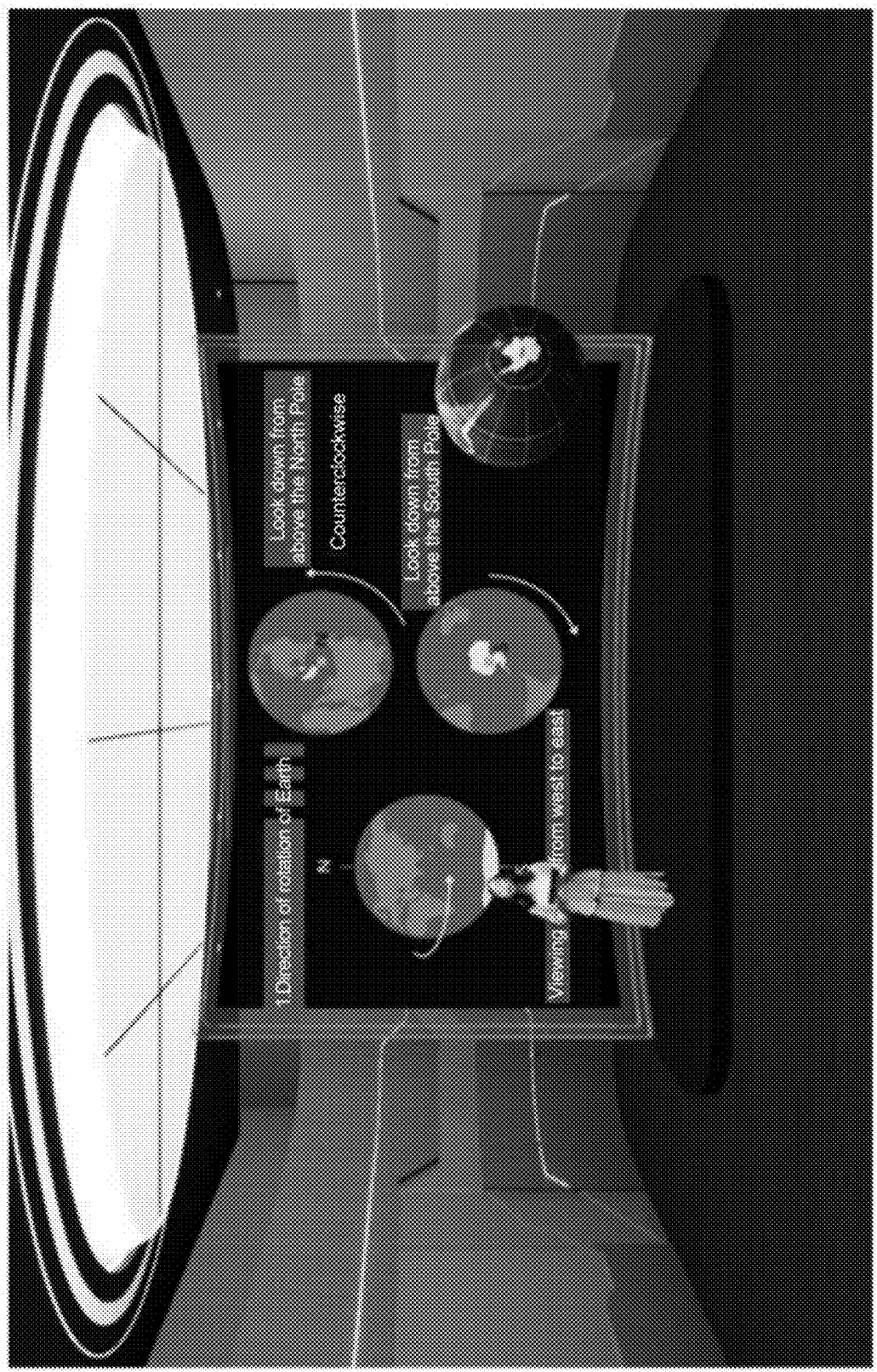
FIG. 12 schematically depicts a teaching behavior of a teacher according to an embodiment of the disclosure.

(S9-1) The content of the view field range and the content of a certain range extending out of viewing angles of the view field of the teacher and the student in the 3D teaching field are selected according to an observing angle of the display terminal. The selected content of the screen is encoded and uploaded via the 5G link to a cloud rendering center. A 5G rendering result is transmitted to the terminal of the teacher and the student with group of pictures (GOPs) as a time granularity followed by displaying on the terminal after decoded. As shown in FIG. 12, a teacher teaches in a virtual teaching space, with a 3D teaching model displayed on a left front of the teacher and a virtual display screen at a rear of the teacher showing a teaching PPT.

(S9-2) A network environment of the terminal device of the teacher and the student are detected. Screen jitter caused by time delay is reduced by using the Session-second-frame three-level bandwidth technology. The bandwidth fluctuation of the terminal is controlled. Video images are decoded and displayed frame by frame within a frame period by using a multi-level caching technology.

(S9-3) An information of posture and location of the teacher and the student are predicted by utilizing the head action. 60-80 ms video content are calculated, rendered and encoded in advance by the edge cloud by combining the information of posture location with the cloud asynchronous rendering technology and a parallel coding technology to reduce a time delay of processing data and coding transmission in the edge cloud. The MTP delay of upstream motion, downstream content transmission and picture response are controlled to be within 20 ms.

The content not described in detail herein belongs to the prior art.

It should be noted that described above are merely some preferred embodiments of the present disclosure, which are not intended to limit the present disclosure. Any improvements, variations and modifications made by those skilled in the art without departing from the scope of the disclosure shall fall within the scope of the present disclosure defined by the appended claims.

What is claimed is:

1. A method for operating a comprehensive three-dimensional (3D) teaching field system, comprising:
(S1) collecting, by a time-of-flight (TOF) depth sensor, a depth data of a real teaching scene to generate a depth map; building a surface mesh model of a real teaching space; dividing an object according to a semantic feature; collecting, by a light detection and ranging (LiDAR), a point cloud data of a teacher to generate a visualization model of the teacher; collecting, by a neck-mounted headset, a voice data of the teacher; and binding the voice data of the teacher to a virtual avatar model of the teacher by using adaptive differential pulse code modulation (ADPCM);
(S2) deploying an edge cloud; building a cloud-edge-end network architecture to support cloud rendering, cloud editing and data transmission; allowing the teacher and a student to log in a virtual teaching space via a terminal; loading different types of data and services from local and the edge cloud; managing loading, saving, updating and deleting operations of an object in the virtual teaching space by using a state control mechanism; and performing data adaptive transmission according to a display control parameter of a user;
wherein the step (S2) is performed through steps of:
(S2-1) deploying a platform of the edge cloud at a concentrated use area of a 3D teaching field; building the cloud-edge-end network architecture; performing a basic architecture calculation and a caching service of data storage, data transmission and rendering in combination with a virtualization function of a central processing unit (CPU) and a graphics processor unit (GPU); and supporting the cloud rendering, cloud editing and data adaptive transmission;
(S2-2) loading, by a display terminal, a virtual scene, a virtual model of the teacher and the student and a teaching resource data from the local when the teacher and the student log in the virtual teaching space; sending a request service to the edge cloud to obtain relevant course information, online or offline state and location of a classroom to be joined;
(S2-3) representing a state of the virtual model of the teacher and the student, a state of a teaching tool, and a location of a virtual teaching activity by active, idle or static during start, execution and stop of the virtual teaching activity; and managing the loading, saving, updating and deleting operations of the object in the virtual teaching space by using a state control mechanism; and
(S2-4) adaptively adjusting a transmission order of each block in a view field based on a user datagram protocol (UDP) according to a rotating direction and speed of a head of the user and position of a fixation point of the user; detecting a network state of the user by using a google congest control (GCC) algorithm; dynamically adjusting a sending bit rate of the data transmission in the 3D teaching field; and controlling a transfer of a data packet between waiting and sending buffer queue by using a sliding window method;
(S3) building a virtual teaching database model to achieve a distributed system storage; generating a data storage and index node by appending an updated feature file to an end; performing data access and scheduling and prediction of performance change of the 3D teaching field based on a performance prediction model; and performing a distributed data storage by using a 3D spatial data adaptive compression algorithm according to spatial clustering;
wherein the step (S3) is performed through steps of:
(S3-1) in view of multi-source, heterogeneous and massive characteristics of the data of the 3D teaching field, building the virtual teaching database model by using the R-tree spatial index structure according to three granularity levels of feature dataset-feature object-3D model, attribute and audio/video element, so as to realize a networked distributed data storage;
(S3-2) serializing the data of the 3D teaching field into a plurality of data blocks according to data type; appending created, edited, modified or deleted data to an end of a feature set file; recording a newly appended relevant information of the object by using a descriptive information of the object; sequentially writing the updated data by segment; and adding an updated index node in the R-tree;
(S3-3) extracting a data transmission throughput, a data transmission rate, the number of service objects per unit time, concurrency, frame rate and frame rate variance; quantifying memory, video memory, hard disk rotating speed, service node tree and disk page distribution law; building the performance prediction model in combination with a spatial index of the 3D comprehensive teaching field; and performing the data access and scheduling and prediction of performance change in a network environment; and
(S3-4) writing a relevant object in another virtual teaching space adjacent to the virtual teaching space to an adjacent or close position in a file by using the 3D spatial data adaptive compression algorithm based on spatial clustering; building a database physical layer model and a database network layer model; and forming a data distribution mode combining a disk page attribute and a spatial data attribute stored in a disk page;
(S4) positioning and tracking, by an ultra-wide-angle tracking sensor camera and an inertial measurement unit (IMU), a head action of the teacher and the student to acquire a view point position and a view field range of the teacher and the student; tracking and recognizing, by an optical motion capture and tracking system, the head action, a body action and a limb action of the teacher and the student; collecting, by the ultra-wide-angle tracking sensor camera, a light spot information of a hand light-emitting diode (LED) lamp; and building a motion prediction model to accurately position a hand interaction point of the teacher and the student during teaching;
(S5) selecting a virtual avatar model of the teacher and the student according to a personalization parameter of the teacher and the student; extracting a key point of a facial feature of the teacher and the student; mapping a facial texture; analyzing a decoded voice feature according to a received voice data; mapping the voice feature to a deformation of a mouth feature point to synchronize a mouth language of the virtual avatar model; dynamically tracking, by an optical motion capture device, a motion of the teacher and the student;

and updating the virtual avatar model in the virtual teaching space in real time;

(S6) creating a school, teaching building and classroom similar to those in the real teaching space; setting positions of a table, chair, whiteboard and screen according to a teaching requirement; creating, by the teacher, the virtual teaching activity according to a teaching plan and curriculum schedule; sending an activity notification to the student by using a course management function; allowing the teacher and the student to enter the virtual teaching space through jumping or roaming according to a classroom number to participate in the virtual teaching activity in a form of virtual avatar model;

(S7) allowing the virtual avatar model of the teacher and the student in the virtual teaching space to perform the virtual teaching activity with the help of a plurality of collaboration tools; allowing the teacher to explain knowledge by means of voice, gesture, blackboard writing and sketch; performing creation, connection, organization and display of a teaching content by using a 3D mind map; and controlling, by a mobile terminal, location of the teaching resource and a display mode of the teaching resource to achieve an interaction and feedback between the teacher and the student;

(S8) allowing an administrator to import an information of the teacher and the student; allowing the teacher to acquire information of learners who select a course; allowing the teacher to manage an announcement, message, homework release and question and answer (Q&A) information in a personal space of the teacher; allowing the teacher to add, modify, delete and adjust the virtual teaching space followed by sharing to other teachers and the students upon being approved by the administrator; and allowing the teacher to manage the virtual teaching resource in the personal space of the teacher and search the virtual teaching resource in a variety of ways; and (S9) selecting a content of the view field range and a content of a certain range extending out of viewing angles of the view field followed by displaying on the terminal through encoding, uploading, 5G rendering and decoding by using a 5G link; controlling a bandwidth fluctuation of the terminal by using a Session-second-frame three-level bandwidth technology; decoding a video image frame by frame by using a multi-level caching technology; displaying the video image; and controlling multi-path transmission (MTP) delay of upstream motion, downstream content and image through combination of a prediction of the head action and a cloud asynchronous rendering technology.

2. A comprehensive 3D teaching field system operated by the method of claim 1, comprising:
a data collection module;
a data transmission and management module;
a data storage module;
a spatial positioning and tracking module;
a virtual avatar display module;
a virtual teaching activity building module;
a teaching interaction module;
a teaching management module; and
a terminal display module;
wherein the data collection module is configured to collect a depth data of a real teaching scene, a point cloud data of a teacher and a voice data of the teacher;
the data transmission and management module is configured to perform cloud rendering, cloud editing and adaptive transmission of different types of data in a 3D teaching field by utilizing a cloud-edge-end network architecture;
the data storage module is configured to perform indexing, updating, scheduling and distributed storage of a data of a virtual teaching space;
the spatial positioning and tracking module is configured to perform positioning and tracking of head, body and hands of the teacher and a student;
the virtual avatar model display module is configured to generate a virtual avatar of the teacher and the student, and synchronize a mouth language and an action in real time;
the virtual teaching activity building module is configured to create the virtual teaching space in the 3D teaching field, create a virtual teaching activity and allow the teacher and the student to join the virtual teaching activity;
the teaching interaction module is configured to perform knowledge explanation a in various forms, 3D display of a teaching content and interaction feedback between the teacher and the student in the virtual teaching space;
the teaching management module is configured to perform a teaching management service and a management service of the virtual teaching space and a virtual teaching resource; and
the terminal display module is configured to perform content display, process of video image delay and time delay optimization control.

3. The method of claim 1, wherein the step (S1) is performed through steps of:

(S1-1) collecting, by the TOF depth sensor, a depth data of a blackboard, platform, teaching tool and wall of the real teaching space segmentedly; combining the depth data of the blackboard, platform, teaching tool and wall of the real teaching space to generate the depth map of the real teaching space by using a feature matching algorithm; building the surface mesh model of the real teaching space; and dividing the object according to the semantic feature;

(S1-2) selecting a teacher with a representative figure according to gender, height, body shape and age; collecting, by the LiDAR, the point cloud data of the teacher; generating a surface model of the teacher by point cloud stitching and network construction; and generating a visualization model of a whole body of the teacher by using a triangular surface simplification algorithm; and (S1-3) collecting, by the neck-mounted headset, the voice data of the teacher during teaching; removing a noise from the collected voice data by acoustic echo cancellation and noise reduction; and transmitting and binding the voice data to the virtual avatar model of the teacher in a 3D teaching activity by using the ADPCM.

4. The method of claim 1, wherein the step (S4) is performed through steps of:

(S4-1) arranging four ultra-wide-angle tracking sensor cameras on top, bottom, left and right of a head mounted display to enlarge an overall observation range of the teacher and the student; positioning and tracking, by the IMU, a head location and a rotation posture of the teacher and the student; and acquiring a location of the view point and the view field range by using the fixation point estimating algorithm;

(S4-2) tracking, by the optical motion capture and tracking system, the head, body and limb actions of the teacher and the student during teaching; generating a positioning and tracking parameter corresponding to a real teaching space by positioning and registering teaching actions of the teacher and the student; and tracking and recognizing head rotation, body movement and limb wave of the teacher and the student; and (S4-3) arranging four LED lamps on a hand controller; synchronizing a flashing frequency of a light-emitting spot of the four LED lamps with a shooting frequency of the four ultra-wide-angle tracking sensor cameras; obtaining a spatial coordinate and posture information of the four LED lamps by using binocular positioning and a Perspective-n-Point (PnP) algorithm; and locating the interaction point of hands of the teacher and the student during the teaching.

5. The method of claim 1, wherein the step (S5) is performed through steps of:

(S5-1) selecting the virtual avatar model of the teacher and the student from a human body model library according to height, body shape, age and gender of the teacher and the student; extracting the facial feature from a head image of the teacher and the student by using a face recognition algorithm; and mapping a keypoint of the facial texture to an eyebrow, eye, nose, mouth and facial contour corresponding to a head of the virtual avatar model by using a keypoint detection algorithm;

(S5-2) extracting a feature control point of a mouth polygon of the virtual avatar model; receiving, by a network transmission module, the voice data of the teacher and a voice data of the student; analyzing a voice feature of the voice data after decoded; and mapping the voice feature to a deformation of a mouth feature point according to a wave amplitude and speech speed to represent a degree and speed of opening and closing of a mouth; and (S5-3) binding the body action and hand action of the teacher and the student acquired in the real teaching space to a bone and hand joint of the virtual avatar model; dynamically tracking, by the optical motion capture device, a motion of the teacher and the student; and driving a corresponding joint of the virtual avatar model of the teacher and the student to move to update and synchronize the motion in real time.

6. The method of claim 1, wherein the step (S6) is performed through steps of:

(S6-1) creating a virtual school, teaching building and classroom similar to the real teaching space in the virtual teaching space; naming the virtual teaching space according to an association rule; generating a unique ID number; setting the positions of the table, chair, whiteboard and screen according to the teaching requirement to enable the virtual teaching space to be suitable for group teaching and discussion;

(S6-2) allowing the teacher to create the virtual teaching activity according to the teaching plan and course schedule; associating a name or ID number of the virtual teaching space; selecting a needed virtual teaching resource and a student who need to participate in the virtual teaching activity; and sending the activity notification to the student by means of the course management function, wherein the activity notification comprises a starting time and duration of the virtual teaching activity and a classroom location; and (S6-3) allowing the teacher and the student to join the virtual teaching activity in a form of the virtual avatar model according to the course schedule upon receiving a course notification or reminder; allowing the teacher and the student to enter the virtual teaching space by jumping according to the classroom number, or to enter the virtual teaching space through a browse sequence of school-teaching building-classroom; and allowing the student to sit at an allocated seat or randomly.

7. The method of claim 1, wherein the step (S7) is performed through steps of:

(S7-1) allowing the teacher and the student to enter the virtual teaching space in a form of the virtual avatar model; displaying a real name or a real-time video on the virtual avatar model; carrying out a one-to-one or one-to-many virtual teaching activity by using a virtual whiteboard, 3D model, flow chart, instant messaging tool and real-time video tool; and explaining, by the teacher, the knowledge to the student by means of voice, gesture, blackboard writing and sketch;

(S7-2) introducing a 3D mind mapping function into the virtual teaching space; allowing the teacher to visually display a concept, process, conclusion in the teaching activity, as well as classification and hierarchical relationship of a knowledge point via a 3D graphic element, text and image; and allowing the teacher to create, connect and organize a virtual teaching content; and (S7-3) setting, by the teacher, the display location and the display mode of the teaching resource via the mobile terminal; allowing the teacher to ask a question to a single student, a group of students or all of students; sending the question to a selected student according to a hand-raising result or responding result; and allowing the selected student to answer the question through inputting an answer in the mobile terminal or via a real-time video.

8. The method of claim 1, wherein the step (S8) is performed through steps of:

(S8-1) allowing the comprehensive 3D teaching field system to access to a national public education platform; importing, by the administrator, the information of the teacher and the student according to a permission policy; acquiring, by the teacher, an information of a student selecting a corresponding course according to information of course selection; and viewing, editing, managing and pushing, by the teacher, the announcement, message, homework release and Q&A information in the personal space of the teacher;

(S8-2) building a unified world coordinate system; allowing the teacher to add, modify, delete and adjust the school, teaching building and classroom in the virtual teaching space followed by uploading to a cloud server; and sharing, to other teachers and the students after being approved by the administrator; and (S8-3) building a cloud resource base; importing, editing and deleting, by the teacher, the virtual teaching resource in the personal space of the teacher; pushing the virtual teaching resource to the terminal of the student; organizing the virtual teaching resource through a knowledge tree; searching the virtual teaching resource based on a resource name, attribute tag and storage path.

9. The method of claim 1, wherein the step (S9) is performed through steps of:

(S9-1) selecting the content of the view field range and the content of a certain range extending out of viewing angles of the view field of the teacher and the student in the 3D teaching field according to an observing angle of the display terminal; encoding and uploading the selected content of the screen via the 5G link to a cloud rendering center; transmitting a 5G rendering result to the terminal of the teacher and the student with group of pictures (GOPs) as a time granularity followed by displaying on the terminal after decoded;

(S9-2) detecting a network environment of the terminal of the teacher and the student; reducing screen jitter caused by time delay by using the Session-second-frame three-level bandwidth technology; controlling the bandwidth fluctuation of the terminal; and decoding and displaying video images frame by frame within a frame period by using a multi-level caching technology; and (S9-3) predicting, by utilizing the head action, an information of posture and location of the teacher and the student; calculating, rendering and encoding a video content of a range corresponding to the 3D teaching field by combining the information of posture and location and the cloud asynchronous rendering technology; and controlling the MTP delay of upstream motion, downstream content transmission and picture response to be within 20 ms.

* * * * *